US012489251B2

(12) United States Patent
Tajima

(10) Patent No.: US 12,489,251 B2
(45) Date of Patent: Dec. 2, 2025

(54) PLUG, CONNECTOR, AND RECEPTACLE

(71) Applicant: YOKOWO CO., LTD., Tokyo (JP)

(72) Inventor: Yasuhiro Tajima, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 328 days.

(21) Appl. No.: 18/033,362

(22) PCT Filed: Jul. 20, 2021

(86) PCT No.: PCT/JP2021/027179
§ 371 (c)(1),
(2) Date: Apr. 24, 2023

(87) PCT Pub. No.: WO2022/091501
PCT Pub. Date: May 5, 2022

(65) Prior Publication Data

US 2024/0022021 A1 Jan. 18, 2024

(30) Foreign Application Priority Data

Oct. 26, 2020 (JP) ................................ 2020-178923

(51) Int. Cl.
*H01R 13/631* (2006.01)
*H01R 13/424* (2006.01)

(52) U.S. Cl.
CPC ......... *H01R 13/631* (2013.01); *H01R 13/424* (2013.01)

(58) Field of Classification Search
CPC .... H01R 13/631; H01R 13/424; H01R 13/24; H01R 12/7005; H01R 27/00; H01R 12/7088; H01R 13/629
See application file for complete search history.

(56) References Cited

U.S. PATENT DOCUMENTS 6,027,363 A * 2/2000 Watt .................... H01R 12/772 439/456
2012/0135621 A1* 5/2012 Hayauchi .............. H01R 12/91 439/247

(Continued)

FOREIGN PATENT DOCUMENTS

JP H09-320684 A 12/1997
JP H11-329625 A 11/1999

(Continued)

OTHER PUBLICATIONS

International Search Report and Written Opinion mailed on Sep. 28, 2021, received for PCT Application PCT/JP2021/027179, filed on Jul. 20, 2021, 10 pages including English Translation.

*Primary Examiner* — Abdullah A Riyami
*Assistant Examiner* — Nader J Alhawamdeh
(74) *Attorney, Agent, or Firm* — XSENSUS LLP

(57) ABSTRACT

A plug of a connector includes a terminal portion to be inserted into and removed from an insertion portion of a receptacle. The terminal portion includes a contact, and a holder portion that holds the contact. The holder portion includes a flange portion having a distal end portion protruding toward an insertion direction of the insertion and removal direction from a distal end of the contact in the insertion direction and protruding in a predetermined orthogonal direction orthogonal to the insertion and removal direction. The flange portion is configured to position the terminal portion inserted into the insertion portion in the orthogonal direction.

7 Claims, 10 Drawing Sheets

(56) References Cited

U.S. PATENT DOCUMENTS

| | | | | |
|---|---|---|---|---|
| 2019/0052002 | A1* | 2/2019 | Hasegawa | H01R 12/716 |
| 2020/0295511 | A1 | 9/2020 | Shioda et al. | |
| 2022/0006239 | A1 | 1/2022 | Shioda et al. | |
| 2023/0299523 | A1* | 9/2023 | Tajima | H01R 13/112 439/733.1 |
| 2024/0022021 | A1* | 1/2024 | Tajima | H01R 13/424 |

FOREIGN PATENT DOCUMENTS

| | | | | | |
|---|---|---|---|---|---|
| JP | 2011040206 | A | * | 2/2011 | H01R 12/716 |
| JP | 2019-071215 | A | | 5/2019 | |
| JP | 2020-024826 | A | | 2/2020 | |
| TW | 201112503 | A | | 4/2011 | |

* cited by examiner

PLUG, CONNECTOR, AND RECEPTACLE

CROSS-REFERENCE TO RELATED APPLICATIONS

The present application is based on PCT filing PCT/JP2021/027179, filed Jul. 20, 2021, which claims priority to Japanese Patent Application No. 2020-178923, filed Oct. 26, 2020, the entire contents of each are incorporated herein by reference.

TECHNICAL FIELD

The present invention relates to a plug and the like that is inserted into and removed from a receptacle in a predetermined insertion and removal direction.

BACKGROUND ART

A plug and a receptacle constituting a connector each include a conductive terminal. When a user performs a connection operation on the connector, a male terminal of the plug is inserted into a female terminal of the receptacle while being brought into sliding contact with the female terminal.

In a case where the plug is inserted into the receptacle in a small connector, if the male terminal and the female terminal are not correctly opposed and connected to each other, an excessive force may be applied on the terminals and cause deformation or damage.

In order to suppress such deformation and damage, some small connectors are provided with a guide structure for guiding the male terminal and the female terminal to a correct positional relationship. For example, Patent Literature 1 discloses a configuration in which a "fitting guide pin" protrudes from a plug and a "fitting guide hole" is provided in a receptacle. During connection of a connector, when the plug is brought close to the receptacle so that the fitting guide pin is aligned with the fitting guide hole, the fitting guide pin and the fitting guide hole are engaged with each other before a male terminal and a female terminal are brought into contact with each other. A tolerance between the fitting guide pin and the fitting guide hole is strictly controlled so as not to cause rattling. The male terminal and the female terminal are guided to a correct positional relationship by inserting the fitting guide pin in sliding contact with an inner surface of the fitting guide hole. Then, the terminals are positioned at correct positions without excessive force on the terminals.

CITATION LIST

Patent Literature

Patent Literature 1: JP2020-24826A

SUMMARY OF INVENTION

Technical Problem

As there is a demand for miniaturization of electronic devices, there is also a demand for miniaturization of connectors. Although the guide structure as described above is useful, an installation space is required, which obstructs the miniaturization.

An object of the present invention is to propose a technique capable of miniaturizing a connector while ensuring a guide function of holding terminals in a predetermined facing relationship at the time of an insertion and removal operation.

Solution to Problem

An aspect of the present invention relates to a plug to be inserted into and removed from a receptacle in a predetermined insertion and removal direction, the plug including: a terminal portion to be inserted into and removed from an insertion portion of the receptacle. The terminal portion includes a contact, and a holder portion that holds the contact. The holder portion includes a flange portion having a distal end portion protruding toward an insertion direction of the insertion and removal direction from a distal end of the contact in the insertion direction and protruding in a predetermined orthogonal direction orthogonal to the insertion and removal direction. The flange portion is configured to position the terminal portion inserted into the insertion portion in the orthogonal direction.

According to the aspect, the terminal portion has not only a function of establishing electrical connection with the receptacle, but also a guide function of restricting and stabilizing a relative movement direction during insertion and removal work by being inserted into and removed from the insertion portion of the receptacle. Therefore, it is possible to make the connector smaller than a connector in the related art in which a guide structure having the guide function is provided separately and exclusively.

DESCRIPTION OF EMBODIMENTS

An example of a preferred embodiment of the present invention will be described, but forms to which the present invention can be applied are not limited to the following embodiment.

Each of the drawings shows three orthogonal axes of a right-handed system with a Z-axis plus direction as an upward direction to indicate common directions. For a plug of a connector, an XpYpZp coordinate system is shown in which an insertion direction (a direction in which the plug is connected to a receptacle) of an insertion and removal direction is set as a Z-axis plus direction. For the receptacle of the connector, an XrYrZr coordinate system is shown in which one of two directions in which the plug can be inserted is set as the Z-axis plus direction. The XpYpZp coordinate system indicates directions for the plug, and the XrYrZr coordinate system indicates directions for the receptacle.

Figure 1:
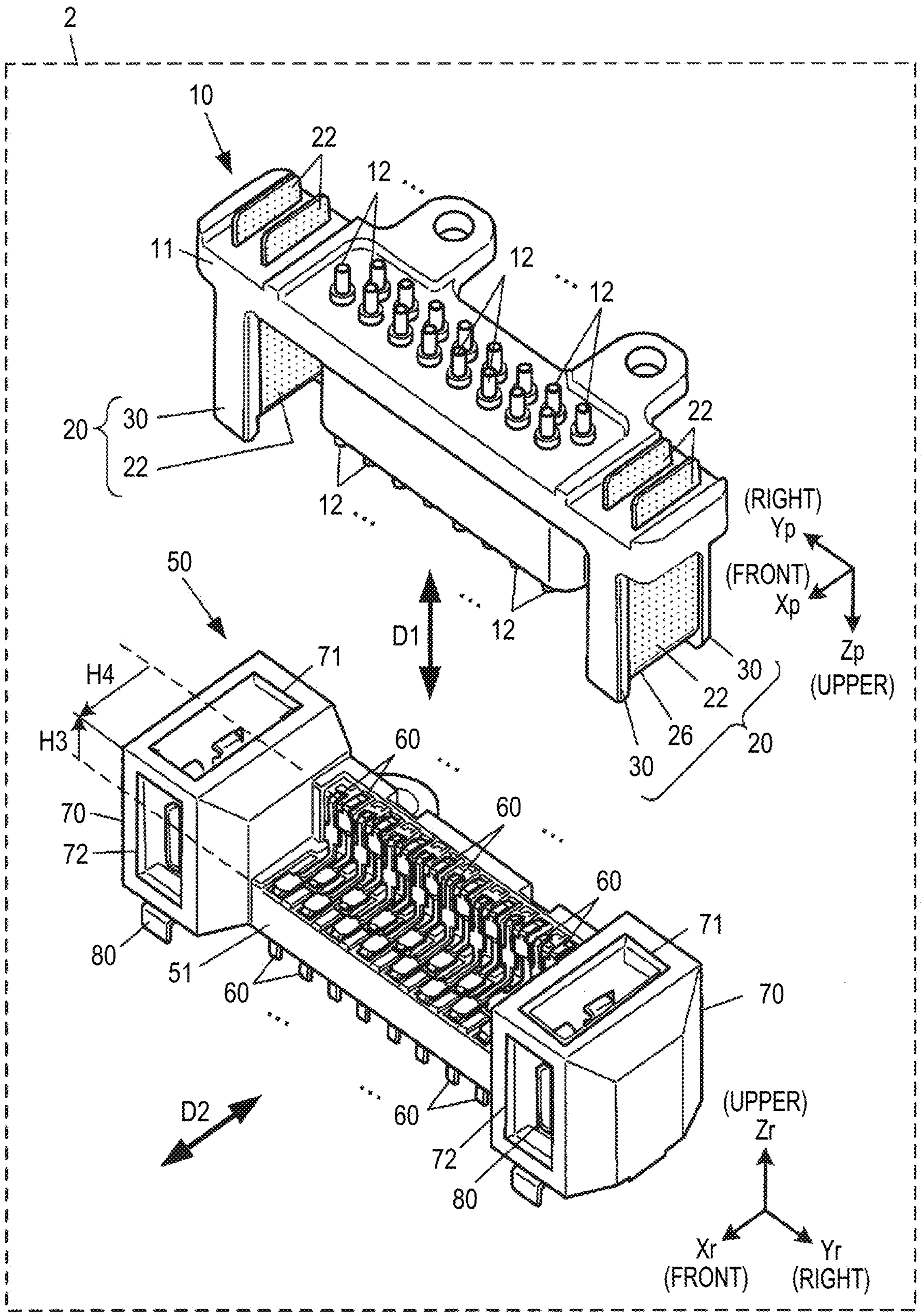
FIG. 1 is a perspective external view showing a configuration example of a connector.

FIG. 1 is a perspective external view showing a configuration example of a connector 2.

The connector 2 includes a plug 10, and a receptacle 50. The plug 10 can be inserted into and removed from the receptacle 50 in either a first insertion and removal direction D1 and a second insertion and removal direction D2.

Figure 2:
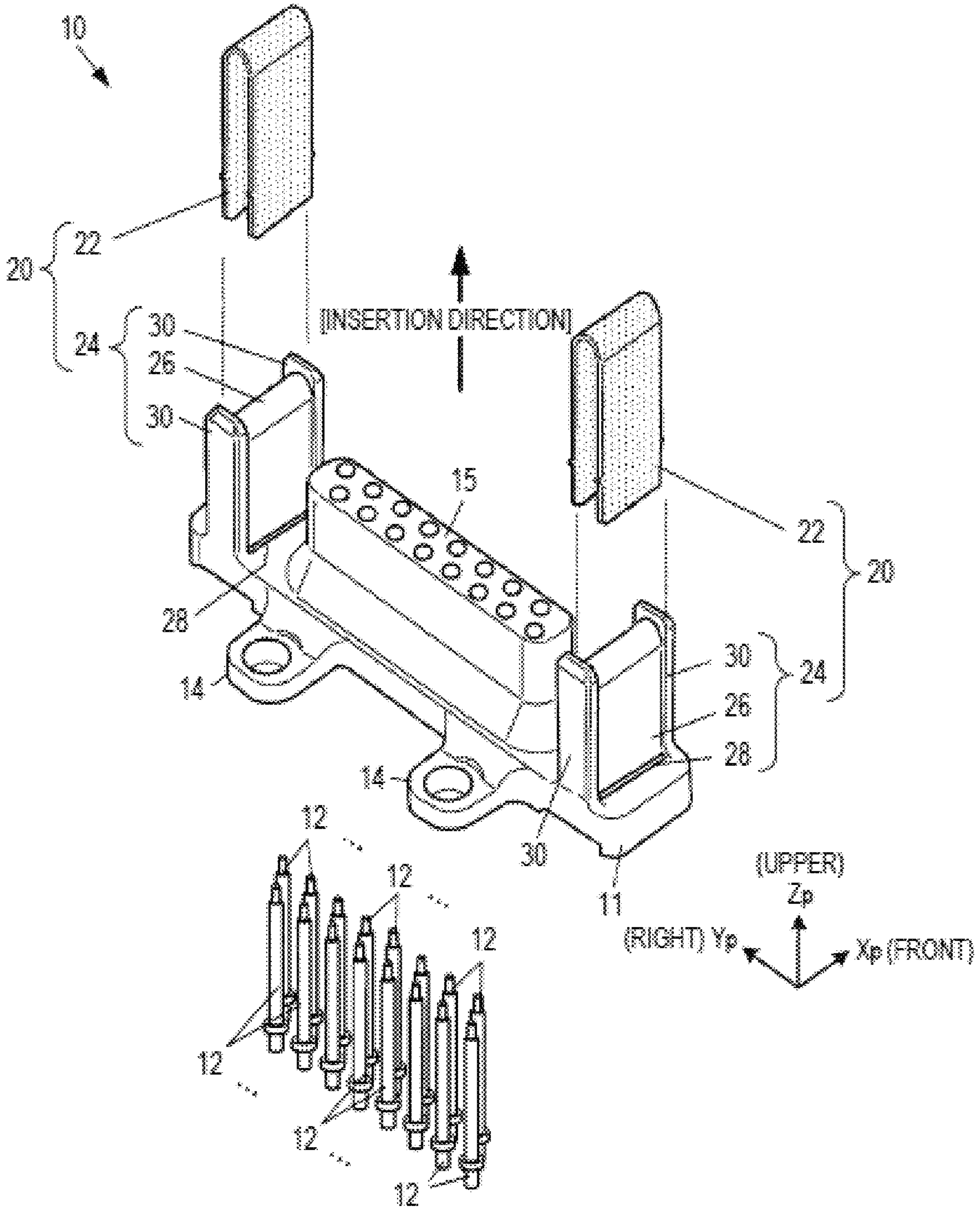
FIG. 2 is an exploded perspective view of a plug.
Figure 3:
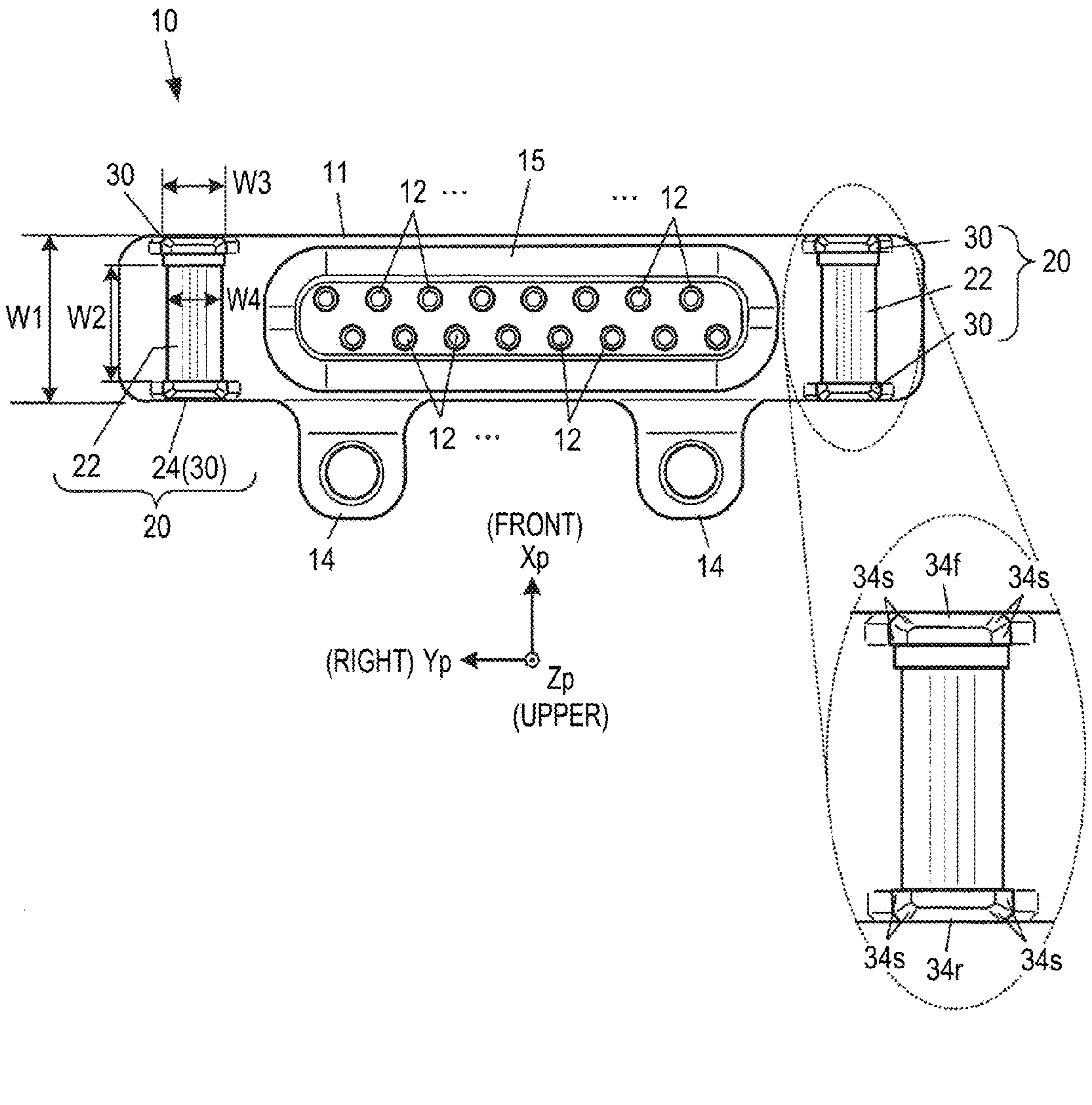
FIG. 3 is a top view of the plug.
Figure 4:
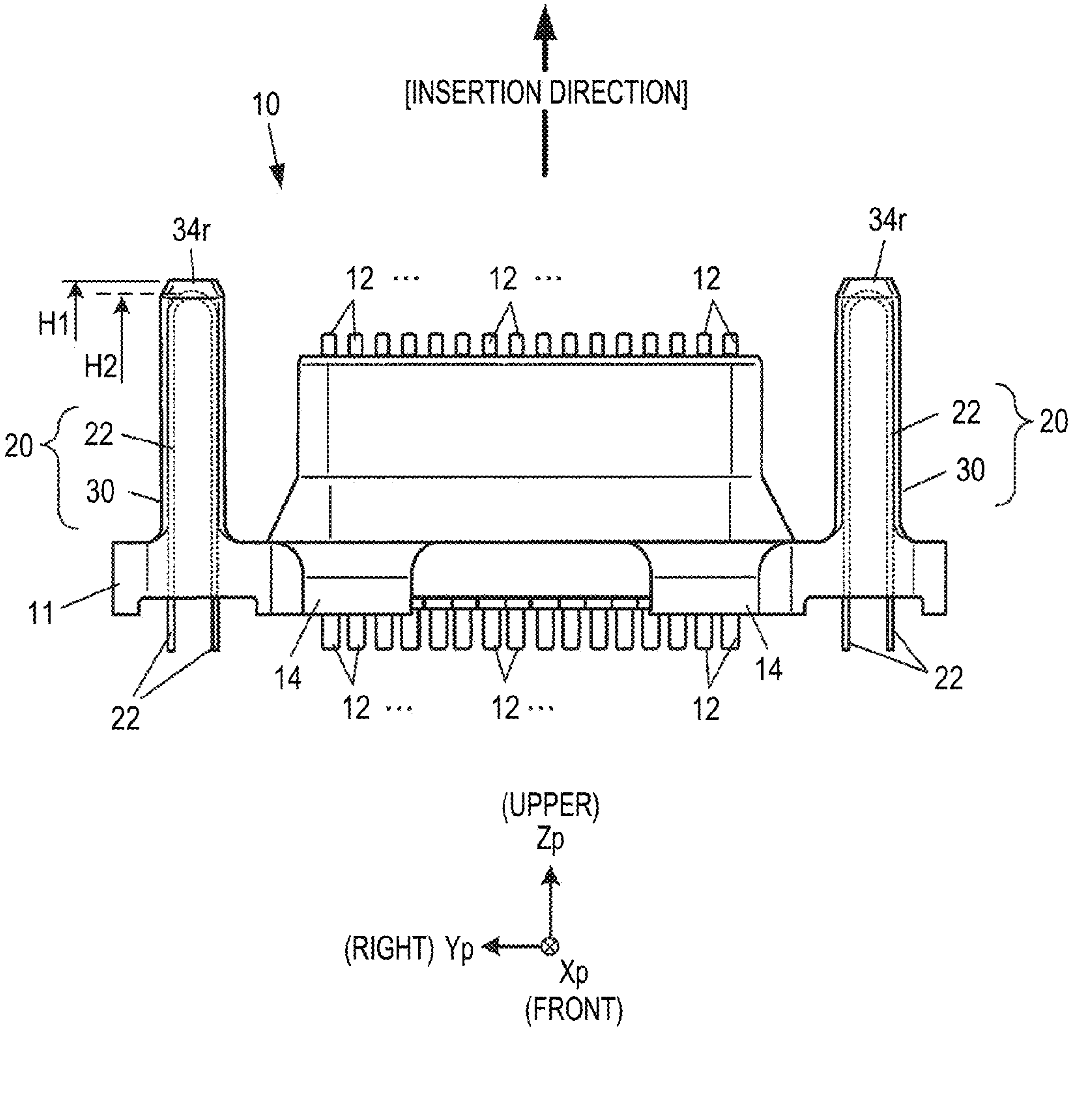
FIG. 4 is a rear view of the plug.

FIG. 2 is an exploded perspective view of the plug 10. FIG. 3 is a top view of the plug 10. FIG. 4 is a rear view of the plug 10.

The plug 10 includes, as configuration components, a housing 11, a plurality of contact pins 12 (contact probes), and two planar contacts 22. The housing 11 is a base portion formed of a non-conductive synthetic resin. The plurality of contact pins 12 (contact probes) are used as signal terminals. The two planar contacts 22 are used as electrodes for positive and negative power supplies.

The planar contact 22 is a sheet metal component formed by bending a strip-shaped (planar elongated in a predetermined direction) conductor by 180° in a long side direction. A bent portion forms a curved surface, and when the planar contact 22 is viewed from the front in an Xp-axis direction, the planar contact 22 has an alphabetical U-shape.

The housing 11 includes fixing portions 14 for screwing to a substrate or the like, a probe support portion 15, and holder portion 24 for holding the planar contacts 22.

The fixing portion 14 is a tongue-shaped portion extending to a rear surface side (an Xp-axis minus side) of the housing 11, and has an insertion hole for a fixing screw.

In FIG. 2, the probe support portion 15 has a hill-like shape protruding upward (Zp plus direction) from a central part in a left and right direction (Yp-axis direction). The probe support portion 15 has a plurality of vertical through holes, and the contact pins 12 are inserted into the vertical through holes respectively so as to be supported and fixed. The contact pins 12 are supported by the probe support portion 15 such that plungers are exposed from an upper surface (a surface on a plus side in a Zp-axis direction) of the probe support portion 15 and sockets are exposed from a lower surface (the minus side in the Zp-axis direction) of the probe support portion 15.

In FIG. 2, the holder portions 24 are portions that hold the planar contacts 22, protrude upward (in a Zp-axis plus direction, insertion direction) from left and right ends of the housing 11, respectively, and have the same shape as the left and right holder portions 24. The holder portions 24 each include a main portion 26, an insertion hole 28, and a pair of flange portions 30. The main portion 26 is a portion for mounting and holding the planar contact 22. The pair of flange portions 30 sandwich the main portion 26 and the planar contact 22 mounted on the main portion 26 in a front-rear direction (Xp-axis direction). A distal end portion of the flange portion 30 protrudes toward the insertion direction of the insertion and removal direction from a distal end of the planar contact 22 in the insertion direction, and protrudes from the main portion 26 in a predetermined orthogonal direction (for example, the Yp-axis direction) orthogonal to the insertion and removal direction.

In FIG. 2, an upper end portion of the main portion 26 has a curved surface protruding upward in accordance with a curvature of a folded portion of the planar contact 22. A front-rear width (a length in the Xp-axis direction) of the main portion 26 is set to a size corresponding to a band width of the planar contact 22. A left-right width (a length in the Yp-axis direction) of the main portion 26 is set to a size corresponding to a left-right width of the planar contact 22 (corresponding to a width of the U shape of the planar contact 22 as viewed from the front (as viewed from the Xp-axis direction)).

In FIG. 2, insertion holes 28 vertically penetrating the housing 11 are respectively provided on left and right sides (a plus side and a minus side in the Yp-axis direction) of a base position of the main portion 26. The planar contact 22 is mounted on and held by the holder portion 24 by covering the main portion 26 from above in a posture in which the folded portion faces upward and the planar contact 22 is in an inverted U shape when viewed from the front, and inserting two lower ends into the respective insertion holes 28.

The flange portions 30 are respectively provided on a front side surface and a rear side surface of the main portion 26. That is, one holder portion 24 has two flange portions 30. Each of the flange portions 30 protrudes upward (in the Zp-axis plus direction) from the upper end (end portion on a Zp-axis plus side) of the main portion 26.

A dimensional relationship of the flange portions 30 will be described in more detail. Since the flange portions 30 are provided on the front and rear side surfaces of the main portion 26, a front-rear width W1 of the holder portion 24 is larger than a width W2 of the planar contact 22 (see FIG. 3). A front-rear center of the holder portion 24 and a front-rear center of the planar contact 22 are at the same position, and two flange portions 30 in the front and rear are at positions sandwiching the planar contact 22, so that contact with the planar contact 22 in the front-rear direction can be suppressed. Further, the flange portions 30 protrude in a left-right direction with respect to the main portion 26 and the planar contact 22, so that a left-right width W3 of the holder portion 24 is larger than a width W4 of the mounted planar contact 22.

Further, as shown in FIG. 4, a distal end (end portion on the plus side in the Zp-axis direction) of the flange portion 30 protrudes upward (the plus side in the Zp-axis direction, in the insertion direction) from a distal end (upper end portion of the folded curved surface portion) of the planar contact 22 mounted on the holder portion 24. When an upper surface of the housing 11 is defined as a reference surface, a height H1 to the distal end of the flange portion 30 is higher than a height H2 to the distal end of the mounted planar contact 22 (see FIG. 4).

A distal end portion of the flange portion 30 is chamfered so as to have an outward tapered surfaces 34 (see an enlarged portion drawn out by a broken line in FIG. 3). Specifically, the flange portion 30 on a front side includes a front tapered surface **34*f* having a. forward and obliquely upward normal, and left and right tapered surfaces 34*s* having a leftward and obliquely upward normal or a rightward and obliquely upward normal. The flange portion 30 on a rear side includes a rear tapered surface 34*r* having a rearward and obliquely upward normal, and left and right tapered surfaces 34*s*** having a leftward and obliquely upward normal or a rightward and obliquely upward normal.

In the present embodiment, the holder portion 24 having two flange portions 30 is described, but the flange portion 30 may be provided on only one of the front side surface and the rear side surface of the main portion 26, and the holder portion may have a T shape in a top view. That is, one holder portion 24 may be provided with the flange portion 30 on at least one side surface adjacent to the main portion 26. In this case, in order to further exert a positioning effect, it is desirable to make a difference between W1 and W2 and a difference between W3 and W4 of the dimensions of the flange portion 30 larger than those of the holder portion 24 having the two flange portions 30 shown in FIG. 3.

Figure 5:
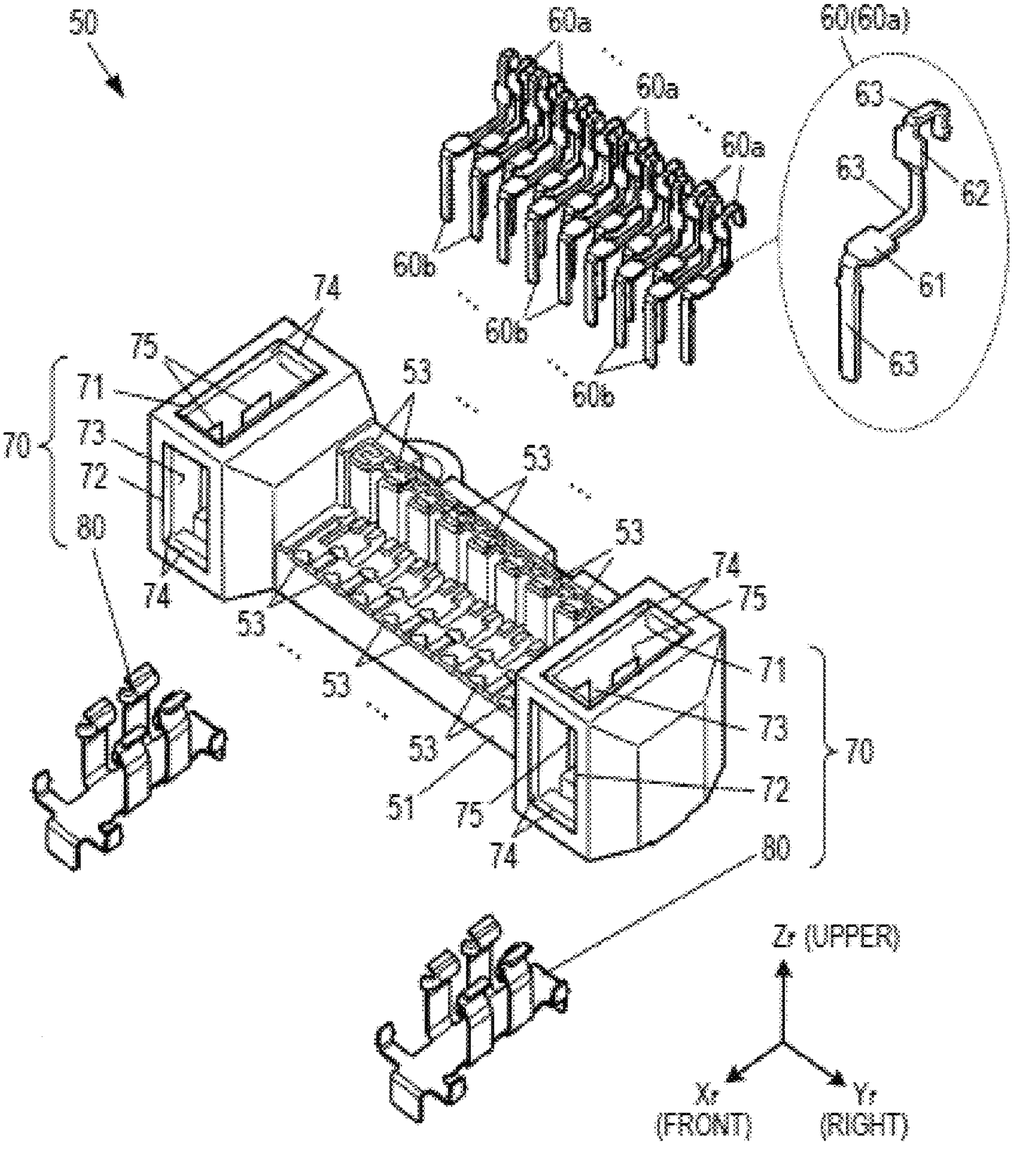
FIG. 5 is a perspective exploded view of a receptacle.

FIG. 5 is a perspective exploded view of the receptacle 50.

The receptacle 50 includes a housing 51, which is a non-conductive base portion, a plurality of pin terminals 60 (60*a*, 60*b*), and insertion portions 70 as a component configuration. The housing 51 has a plurality of terminal attachment portions 53 on which the pin terminals 60 are mounted at the center in the left-right direction (Yr-axis direction), and the insertion portions 70 are disposed at both left and right ends.

The pin terminals 60 (60*a*, 60*b*) are conductors prepared in one-to-one correspondence with the contact pins 12, and are sheet metal parts bent in a stepped shape in a side view (Yr-direction view). One pin terminal 60 includes a first contact portion 61, a second contact portion 62, and a coupling portion 63 that linearly couples the first contact portion 61 and the second contact portion 62, There are two types of pin terminals 60 (a first type pin terminal 60*a* and a second type pin terminal 60*b*) due to a difference in dimension of the coupling portion 63, and these two types are alternately arranged in the left-right direction and mounted on the terminal attachment portions 53.

The first contact portion 61 is a widened portion having a rectangular surface which is prepared to come into contact with the contact pin 12 When the plug 10 is inserted from the first insertion and removal direction D1 (see FIG. 1) and whose normal faces upward (a Zr-axis plus direction).

The second contact portion 62 is a widened portion having a rectangular surface which is prepared to come into contact with the contact pin 12 when the plug 10 is inserted from the second insertion and removal direction D2 (see FIG. 1) and whose normal faces forward (an Xr-axis plus direction).

The coupling portion 63 integrally connects the first contact portion 61 and the second contact portion 62 in this order from the lower side, and engages with the terminal attachment portion 53. The coupling portion 63 at a lower end (an end portion on a Zr-axis minus side) is vertically formed in a straight shape, and is inserted into the vertical through hole of the terminal attachment portion 53 so that the lower end is exposed from a lower surface of the receptacle 50. The coupling portion 63 at an upper end is bent into a key shape, and is inserted into and locked to an engagement hole of the terminal attachment portion 53. The pin terminal 60 is divided into the first type pin terminal 60*a* and first second type pin terminal 60*b* by a difference in dimension of the coupling portion 63 at a middle part.

The insertion portion 70 is a part into which a terminal portion 20 of the plug 10 is inserted, and one insertion portion 70 is prepared for one terminal portion 20. One insertion portion 70 includes a rectangular parallelepiped internal space 73 and a female terminal 80 that forms an electrical connection with the planar contact 22 and supplies power.

The internal space 73 includes a first opening portion 71 that opens in the first insertion and removal direction D1 and a second opening portion 72 that opens in the second insertion and removal direction D2. The first opening portion 71 and the second opening portion 72 each have a tapered surface 74 with an inward normal on all four sides of an opening edge.

The internal space 73 has a shape and a size capable of accommodating the terminal portion 20 of the plug 10.

A tolerance (allowable error) of a fitting dimension between an inner dimension of the internal space 73 and an outer dimension of the terminal portion 20 (specifically, the front-rear width W1 of the holder portion 24 and the left-right width W3 of the holder portion 24, see FIG. 3) is set to satisfy the following condition. That is, the tolerance is set to satisfy the conditions of (1) the plug 10 inserted into and removed from the insertion portion 70 is appropriately brought into sliding contact with an inner surface of the opening portion of the internal space 73, so as to exhibit a guide function during a connection operation of the connector 2, and (2) it is suitable for functioning as "positioning" in the front-rear direction (Xr-axis direction) and the left-right direction (Yr-axis direction) when the insertion is completed. Specifically, the distal end of the contact pin 12 is set to be positioned within a range of the corresponding first contact portion 61 or second contact portion 62.

Figure 6:
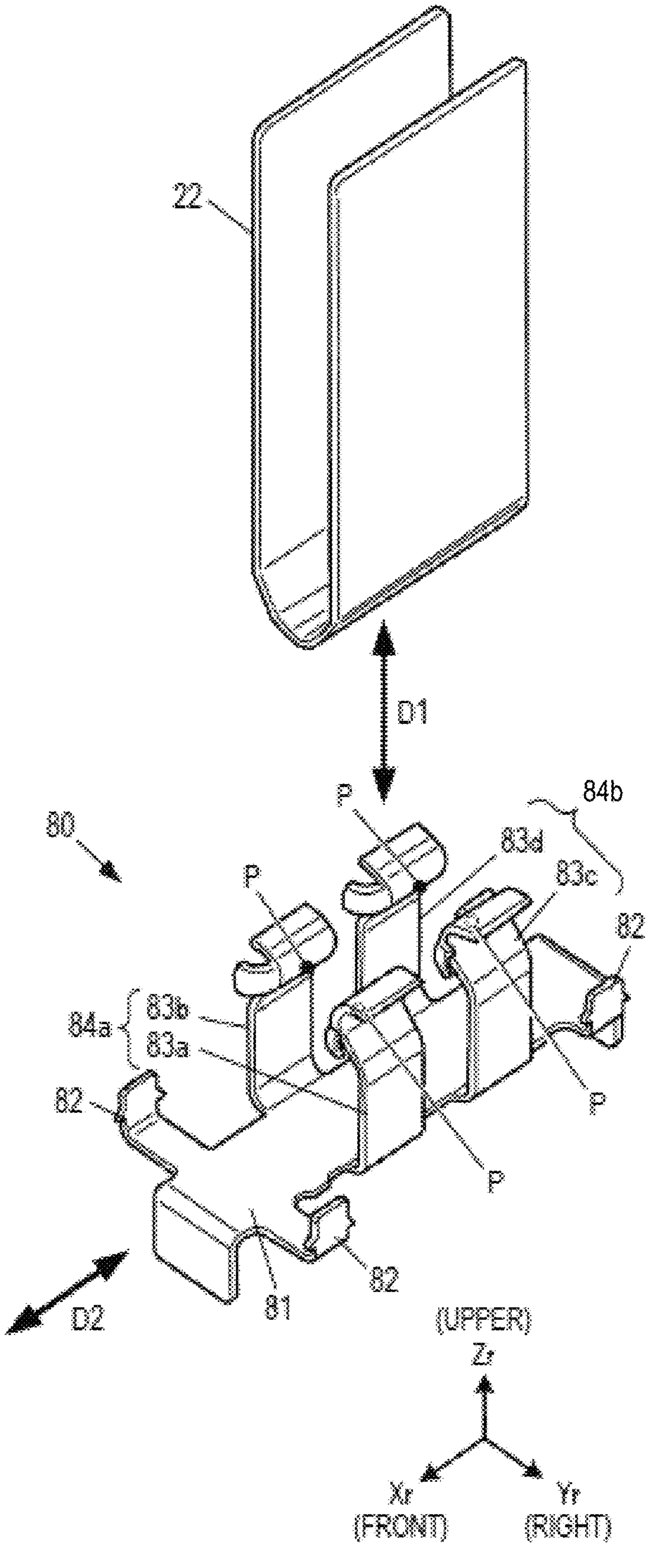
FIG. 6 is a perspective view of a female terminal.
Figure 7:
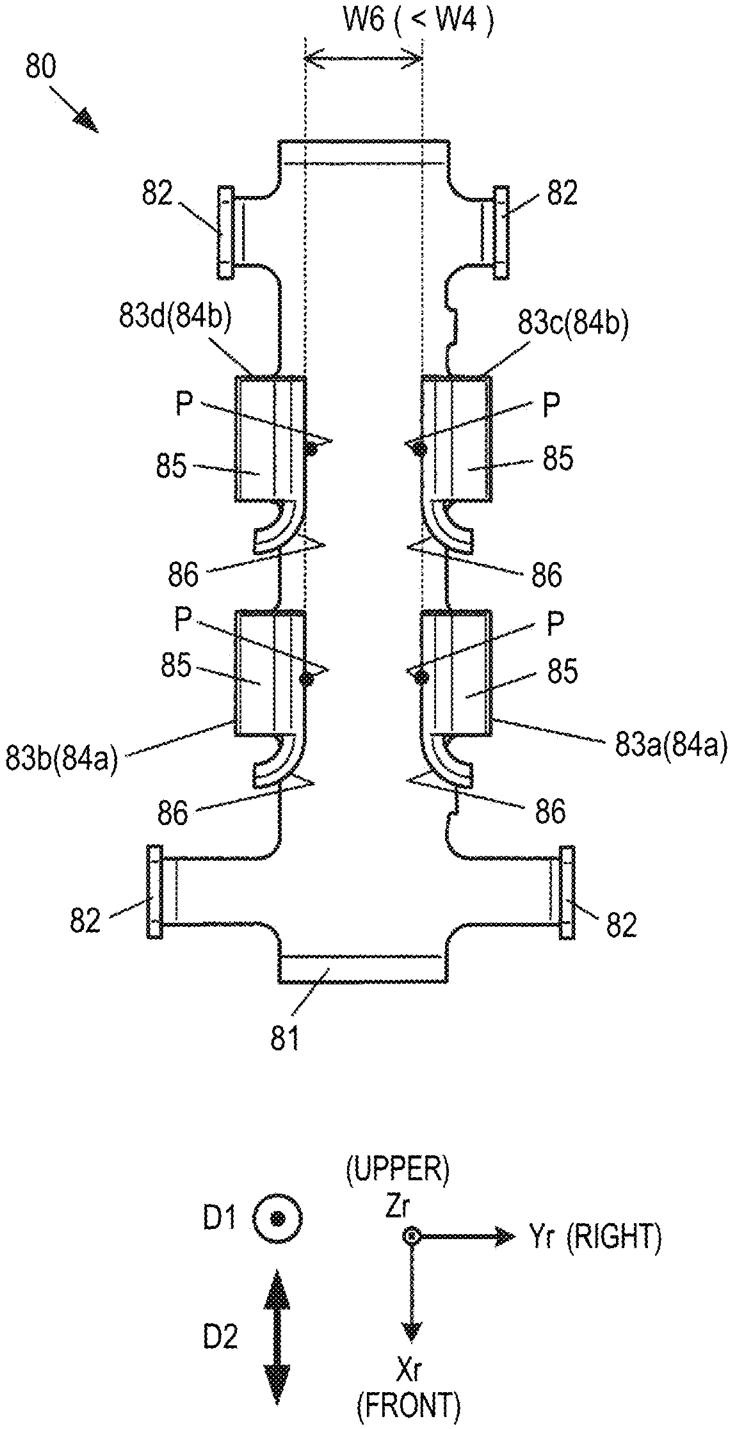
FIG. 7 is a top view of the female terminal.

FIG. 6 is a perspective view of the female terminal 80. in order to facilitate understanding, a planar contact 22 corresponding to a male terminal is additionally shown. FIG. 7 is a top view of the female terminal 80.

The female terminal 80 is a conductive sheet metal component mounted on a bottom surface of the internal space 73. The female terminal 80 comes into contact with the planar contact 22 inserted in the first insertion and removal direction D1 or the second insertion and removal direction D2 to form an electric circuit.

Specifically, the female terminal 80 includes a base portion 81, engagement pieces 82 extending from the base portion 81, and four arm portions 83 (a first arm portion 83*a*, a second arm portion 83*b*, a third arm portion 83*c*, and a fourth arm portion 83*d*) extending from the base portion 81 in the first insertion and removal direction D1.

The base portion 81 has a flat shape elongated in the front-rear direction, and is mounted and fixed to the insertion portion 70 by being engaged with an engagement hole provided in the internal space 73 of the insertion portion 70 by the engagement pieces 82.

Regarding lengths of the arm portions 83 (83*a* to 83*d*) in the first insertion and removal direction D1 (upper-lower direction), the first arm portion 83*a* and the second arm portion 83*b* have the same first length, and the third arm portion 83*c* and the fourth arm portion 83*d* have the same second length. The second length is longer than the first length.

The first arm portion 83*a* extends upward from a right side (Yr-axis plus side) of the base portion 81, and the second arm portion 83*b* extends upward from a left side (Yr-axis minus side) of the base portion 81. The first arm portion 83*a* and the second arm portion 83*b* are disposed to face each other with the base portion 81 interposed therebetween, and form a first arm portion pair 84*a*.

The third arm portion 83*c* and the fourth arm portion 83*d* are provided at positions behind the first arm portion 83*a* and the second arm portion 83*b* in the second insertion and removal direction D2 (front-rear direction). The third arm portion 83*c* extends upward from the right side (Yr-axis plus side) of the base portion 81, and the fourth arm portion 83*d* extends upward from the left side (Yr-axis minus side) of the base portion 81. The third arm portion 83*c* and the fourth arm portion 83*d* are disposed to face each other with the base portion 81 interposed therebetween, and form a second arm portion pair 84*b*.

The plurality of arm portion pairs are disposed along the second insertion and removal direction D2 such that the first arm portion pair 84*a* is on the front side and the second arm portion pair 84*b* is on the rear side. The first arm portion pair

84*a* and the second arm portion pair 84*b* each have contact points P at positions facing each other for each pair. The contact point P is conveniently illustrated in a form of a black dot in FIG. 6 for the sake of easy understanding, and the contact with the flat portion of the planar contact 22 is a line contact or a surface contact that is long in the front-rear direction of the arm portions 83 (83*a* to 83*d*) including the contact point P.

The contact point P is located in the vicinity of an upper distal end of each of the arm portions 83 (83*a* to 83*d*), and corresponds to a portion of each of the arm portion pairs 84 (84*a* and 84*b*) that is narrowest in the left-right direction.

As shown in FIG. 7, the first arm portion pair 84*a* has first inclined portions 85 at end portions of the facing arm portions 83 on a side close to the first opening portion 71. The first inclined portions 85 widen a distance between the first arm portion 83*a* and the second arm portion 83*b* in the left-right direction of the female terminal 80 toward the first opening portion 71. Similarly, the second arm portion pair 84*b* has the first inclined portions 85 at end portions of the facing arm portions 83 on the side close to the first opening portion 71, The first inclined portions 85 of the second arm portion pair 84*b* widen a distance between the third arm portion 83*c* and the fourth arm portion 83*d* in the left-right direction of the female terminal 80 toward the first opening portion 71.

Further, the first arm portion pair 84*a* has second inclined portions 86 at end portions of the facing arm portions 83 on a side close to the second opening portion 72. The second inclined portions 86 widen a distance between the first arm portion 83*a* and the second arm portion 83*b* in the left-right direction of the female terminal 80 toward the second opening portion 72. Similarly, the second arm portion pair 84*b* includes the second inclined portions 86 at end portions of the facing arm portions 83 on the side close to the second opening portion 72. The second inclined portions 86 of the second arm portion pair 84*b* widen a distance between the third arm portion 83*c* and the fourth arm portion 83*d* in the left-right direction of the female terminal 80 toward the second opening portion 72.

The second inclined portion 86 extends from the contact point P of each arm portion 83 (83*a* to 83*d*) toward the second opening portion 72, and a surface of the second inclined portion 86 is continuously connected to the contact point P. The contact point P, the first inclined portion 85, and the second inclined portion 86 in each arm portion 83 (83*a* to 83*d*) are formed in a continuous bent shape, and are formed by sheet metal machining.

The contact points P are portions where a facing distance (a left-right direction distance W6 (see FIG. 7)) of the first inclined portions 85 of the facing arm portions 83 (83*a* to 83*d*) is the smallest, and correspond to portions where the facing distance (the left-right direction distance W6) is also the smallest for the facing second inclined portions 86. The left-right direction distance W6 between the contact points P is set to be slightly smaller than the left-right direction width W4 (see FIG. 3) of the planar contact 22 mounted on the holder portion 24.

Returning to FIG. 5, on an inner surface of the internal space 73, recessed portions 75 (four for each internal space 73) capable of accommodating the arm portions 83 (83*a* to 83*d*) are provided at respective portions facing the arm portions 83 (83*a* to 83*d*) of the female terminal 80 in a mounted state.

Regarding a dimensional relationship of the receptacle 50, specifically, an upper end position of the insertion portion 70, that is, an opening position of the first opening portion 71 is located on an upper side (on a Zr-axis plus side) of the first contact portion 61 of the pin terminal 60 attached to the terminal attachment portion 53 (height H3 in FIG. 1). A front end position of the insertion portion 70, that is, an opening position of the second opening portion 72 is located on the front side (on an Xr-axis plus side) of the second contact portion 62 of the pin terminal 60 attached to the terminal attachment portion 53 (height H4 in FIG. 1).

Next, the connection operation of the connector 2 in which the plug 10 is connected from the first insertion and removal direction D1 will be described with reference to FIGS. 1 and 8 to 10.

As shown in FIG. 1, in order to connect the plug 10 to the receptacle 50 from the first insertion and removal direction D1, the terminal portions 20 of the plug 10 are brought close to and inserted into the insertion portions 70 of the receptacle 50 in a relative posture in which an upper end (an end portion on the Zp-axis plus side) of the plug 10 and a top surface (Zr-axis plus direction) of the receptacle 50 face each other.

Figure 8:
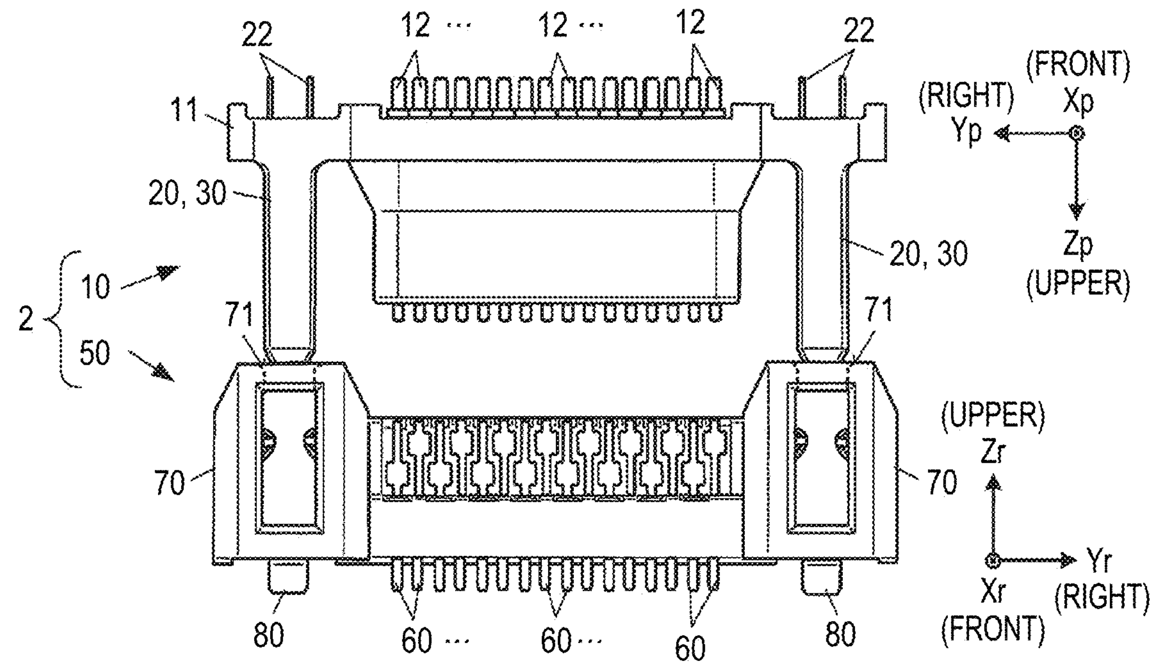
FIG. 8 is a view illustrating a connection operation of the connector (part 1).

In the plug 10, upper end positions of the terminal portions 20 protrude from distal ends of the contact pins 12. In the receptacle 50, the opening position of the first opening portion 71 of the insertion portion 70 is higher than the first contact portions 61 of the pin terminals 60 attached to the terminal attachment portion 53. Therefore, as shown in FIG. 8, when the plug 10 is brought close to the receptacle 50, the terminal portions 20 and the first opening portions 71 first come into contact with each other. To be precise, the flange portions 30 of the terminal portion 20 and the first opening portion 71 come into contact with each other.

The tapered surfaces 34 (34*f*, 34*s*, 34*r*; see FIG. 3) are provided at the distal ends of the flange portions 30. The first opening portions 71 are also provided with the tapered surfaces 74 (see FIG. 5). Therefore, even if the distal ends of the flange portions 30 come into contact with the first opening portions 71 at a position slightly deviated from the first opening portion 71, the tapered surfaces 34 and the tapered surfaces 74 exert a guide function of positioning so that the terminal portion 20 is in a positional relationship to be located with respect to the first opening portion 71, and the insertion can be started smoothly.

Figure 9:
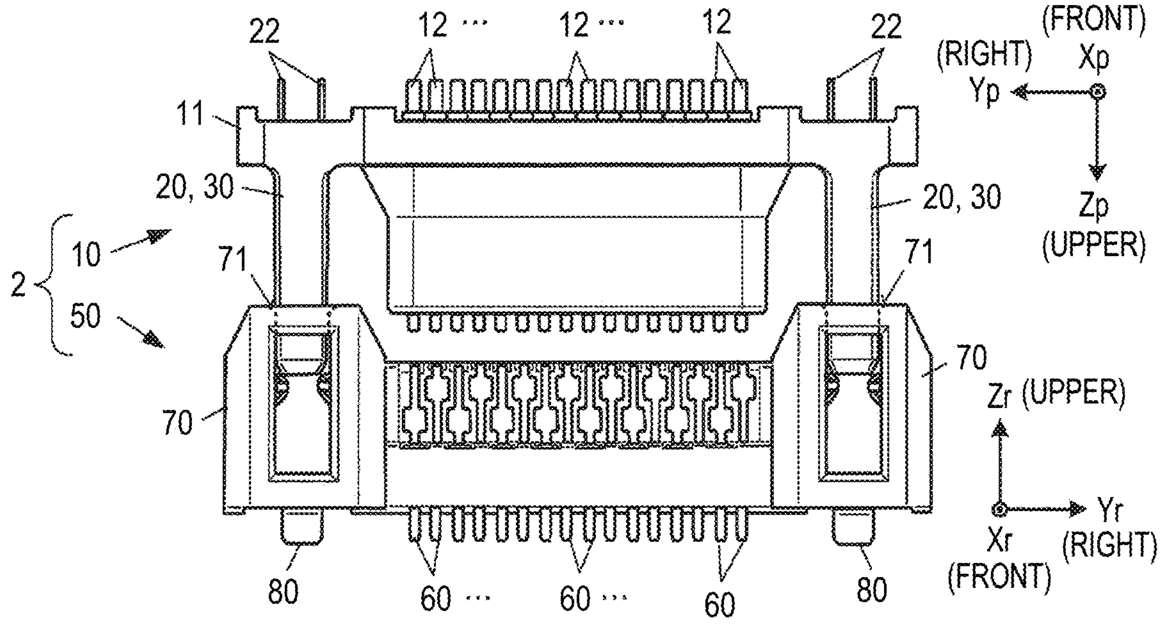
FIG. 9 is a view illustrating the connection operation of the connector (part 2).

As shown in FIG. 9, when the distal ends of the flange portions 30 enter the first opening portions 71, outer side surfaces of the flange portions 30 come into sliding contact with inner side surfaces of the internal spaces 73 of the insertion portions 70, and the guide function in the first insertion and removal direction D1 (in this case, the insertion direction) is exerted.

The terminal portion 20 is provided with the flange portions 30 at front and rear positions separated from each other in the Yp-axis direction. An Xp-Yp cross-sectional shape that surrounds out sides of the pair of front and rear flange portions 30 in the top view is a shape and a size that match an Xr-Yr cross-sectional shape of the internal space 73 of the insertion portion 70. Therefore, a position of the terminal portion 20 inserted into the insertion portion 70 is positioned by the pair of flange portions 30 in a direction parallel to a plane orthogonal to the insertion and removal direction. Therefore, the plug 10 is continuously held in a relative posture in which each of the plurality of contact pins 12 approaches the first contact portion 61 of the corresponding pin terminal 60 from a front (from the Zr-axis plus direction). The positioning function is also exhibited by one terminal portion 20, but the plug 10 includes a plurality of terminal portions 20. Therefore, the positioning function is reliably and stably exhibited.

After the terminal portion 20 is inserted into the first opening portion 71, the bent portion on an upper end of the planar contact 22 comes into contact with the first inclined portions 85 of the female terminal 80 soon. The planar contact 22 is further inserted while pushing and expanding the arm portions 83 (83*a* to 83*d*) to the left and right while the distal end portion is in sliding contact with the first inclined portions 85. At this time, the arm portions 83 (83*a* to 83*d*) are bent while maintaining the contact to the left and right outer sides so as to enter the recessed portions 75 (see FIG. 5) of the internal space 73 respectively, and a space for further inserting the terminal portion 20 is opened.

Figure 10:
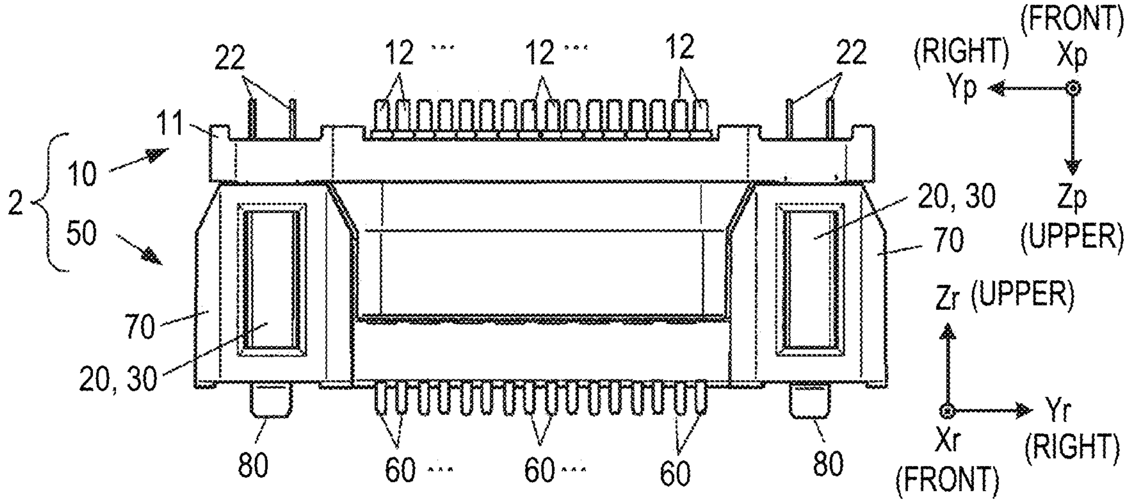
FIG. 10 is a view illustrating the connection operation of the connector (part 3).

When the insertion further proceeds, the upper surface of the housing 11 of the plug 10 (specifically, a portion corresponding to the base of the terminal portion 20) comes into contact with an upper surface of the insertion portion 70 of the receptacle 50, and the insertion is completed as shown in FIG. 10. The connector 2 is in a connection completed state.

Before the connection completed state, the distal end of each contact pin 12 starts to come into contact with the first contact portion 61 of the corresponding pin terminal 60. By the guide function, the contact pins 12 and the pin terminals 60 approach and come into contact with each other while maintaining a relative posture facing each other. Therefore, all of the contact pins 12 do not obliquely come into contact with the pin terminals 60 and an excessive force is not applied, and do not collide with other places that are not supposed to be brought into contact in the insertion process.

The tolerance (allowable error) of the fitting dimensional between the inner dimension of the internal space 73 and the outer dimension of the terminal portion 20 is set to be appropriate for functioning as "positioning" in the front-rear direction (Xr-axis direction) and the left-right direction (Yr-axis direction) when the insertion is completed. Therefore, each contact pin 12 is positioned so as to reliably come into contact with a range of the first contact portion 61 of the corresponding pin terminal 60.

In the connection completed state, the planar contact 22 is connected to the four arm portions 83 (83*a* to 83*d*) of the female terminal 80 at four points at planar portions on the left and right sides. By connecting with a plurality of contact points, a relatively large current can be made to flow stably with low resistance.

In order to release the connection of the connector 2, the plug 10 may be released so as to be separated from the receptacle 50. The positional relationship between the terminal portion 20 and the insertion portion 70 and the states of the portions follow the reverse of those at the time of connection described above. Therefore, even in a release operation process, the contact pin 12 does not collide with other places that are not supposed to be brought into contact in the middle of the release.

When the plug 10 is connected to the receptacle 50 from the second insertion and removal direction D2, the plug 10 is connected such that an upper end (an end portion on the Zp-axis plus side) faces the front surface (the Xr-axis plus direction) of the receptacle 50 (in a (Xr-axis minus direction), and the terminal portions 20 are inserted into the second opening portions 72. The same effect as in the case where the plug 10 is connected to the receptacle 50 from the first insertion and removal direction D1 can be obtained.

Other Embodiments

Although several embodiments have been described above, modes to which the present invention can be applied are not limited to the above embodiments, and components may be appropriately added, omitted, or changed.

Figure 11:
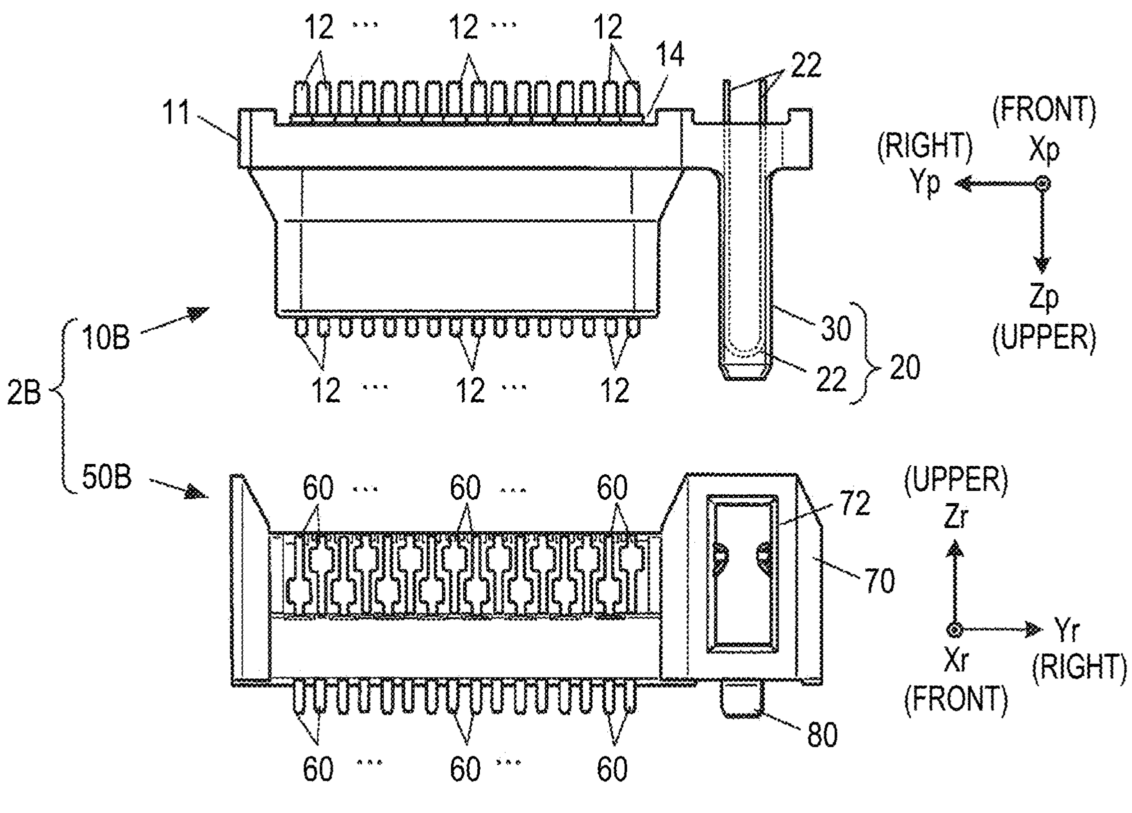
FIG. 11 is a front view of a connector according to a first modification.

For example, two terminal portions 20 are provided in the above embodiment, Alternatively, only one terminal portion 20 may be provided on the left side (or the right side) of the housing 11 as in a plug 10B of a connector 2B shown in FIG. 11. A receptacle 50B of the connector 2B has only one insertion portion 70.

Figure 12:
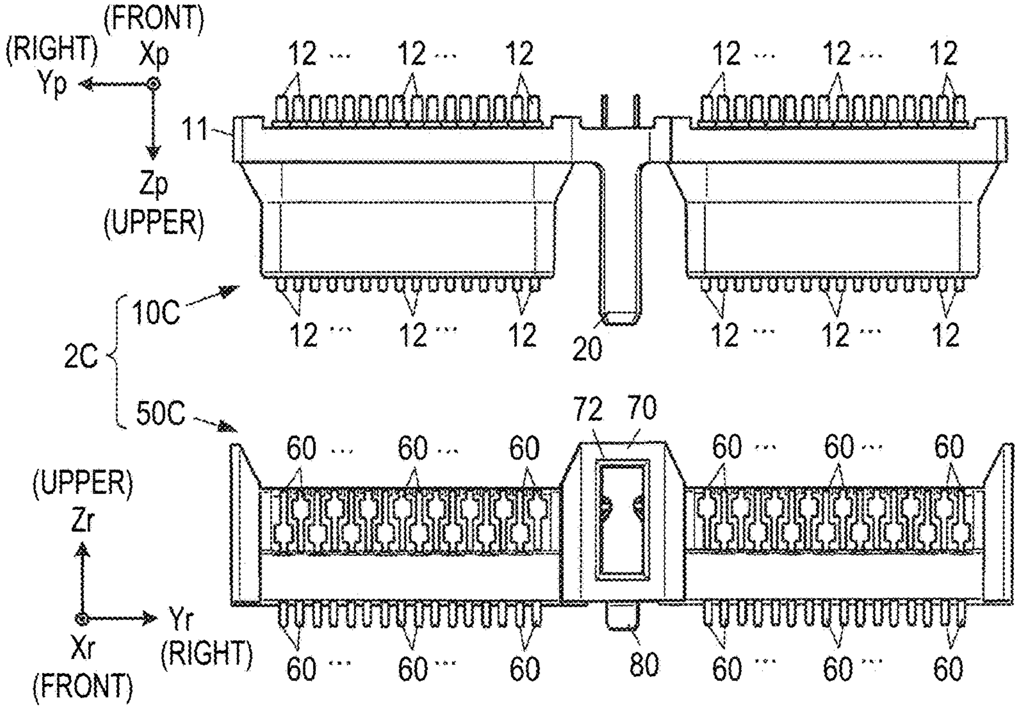
FIG. 12 is a front view of a connector according to a second modification.

As in a plug 10C of a connector 2C shown in FIG. 12, the terminal portion 20 may be disposed at an intermediate position in the left-right direction of the housing 11. A receptacle 50C of the connector 2C has the insertion portion 70 at an intermediate position in the left-right direction.

Figure 13:
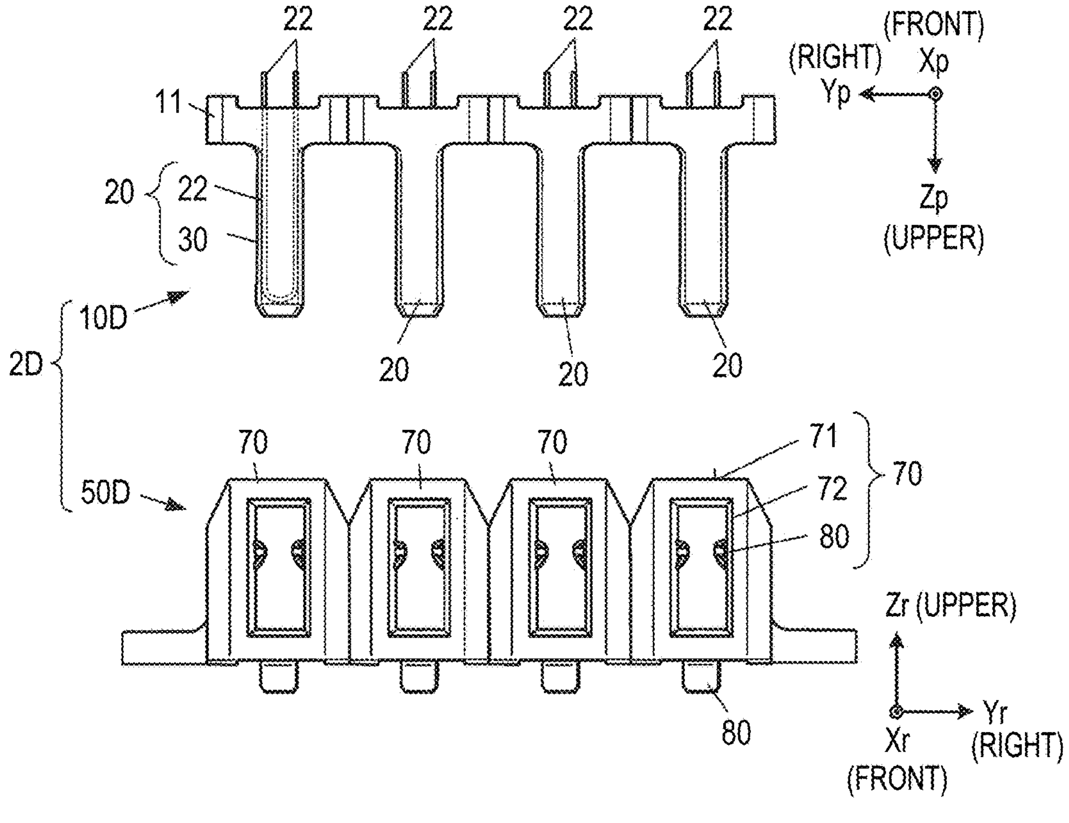
FIG. 13 is a front view of a connector according to a third modification.

As in a plug of a connector 2D shown in FIG. 13, two or more terminal portions 20 may be provided, and the contact pins 12 may be omitted. In this configuration, the planar contact 22 may be used not only as a power supply electrode but also as a signal electrode.

In the above embodiment, the term "receptacle" is used as an example, but the term "receptacle" is merely a term for convenience. A form of another term such as a jack is also the same embodiment.

The disclosure of the present specification including the embodiments and the modifications thereof described above can be summarized as follows.

An aspect of the present disclosure relates to a plug to be inserted into and removed from a receptacle in a predetermined insertion and removal direction, the plug including: a terminal portion to be inserted into and removed from an insertion portion of the receptacle, The terminal portion includes a contact, and a holder portion that holds the contact. The holder portion includes a flange portion having a distal end portion protruding toward an insertion direction of the insertion and removal direction from a distal end of the contact in the insertion direction and protruding in a predetermined orthogonal direction orthogonal to the insertion and removal direction. The flange portion is configured to position the terminal portion inserted into the insertion portion in the orthogonal direction.

According to the aspect of the present disclosure, the terminal portion has not only a function of establishing electrical connection with the receptacle, but also a guide function of restricting and stabilizing a relative movement direction during insertion and removal work by being inserted into and removed from the insertion portion of the receptacle. Therefore, it is possible to make the connector smaller than a connector in the related art in which a guide structure having the guide function is provided separately and exclusively.

The distal end portion of the holder portion may have a tapered surface.

As a result, the terminal portion is smoothly inserted into the insertion portion.

The holder portion may have the flange portion on at least one side with the contact being interposed, and a pair of the flange portions may be configured to position the terminal portion inserted into the insertion portion in a direction parallel to a plane orthogonal to the insertion and removal direction.

As a result, the function and effect of the guide function can be enhanced.

The contact may be a planar conductor.

As a result, the electrical connection is enabled at a plurality of contact points on a planar portion, and a relatively large current can be made to flow stably with low resistance.

The contact may be a conductor having a bent shape.

As a result, a larger area for electrical contact can be secured by one contact.

The holder portion may have a main portion adjacent to the flange portion, and the contact may be a planar conductor having a bent shape along a surface of the main portion.

As a result, a larger area for electrical contact can be secured by one contact while the contact is reliably held.

Two terminal portions may be provided at positions separated from each other in the orthogonal direction.

As a result, the guide function of the terminal portion can be improved.

A plurality of contact pins may be provided between the two terminal portions.

As a result, a plurality of electrical connections can be implemented by one connector.

Another aspect relates to a connector including: the plug according to any one of the above aspects; and the receptacle into and from which the plug is to be inserted and removed in the insertion and removal direction.

According to this aspect, it is possible to implement a connector that can obtain the same effects as those of the above aspects.

Another aspect relates to a receptacle to be electrically connected with the plug according to any one of the above aspects by inserting and removing the terminal portion of the plug.

In the receptacle, the insertion portion may have a tapered surface.

As a result, the terminal portion is smoothly inserted into the insertion portions.

REFERENCE SIGNS LIST

2, 2B, 2C, 2D connector
10, 10B, 10C plug
11 housing
12 contact pin
14 fixing portion
15 probe support portion
20 terminal portion
22 planar contact
24 holder portion
26 main portion
28 insertion hole
30 flange portion
34 tapered surface
34*f* front tapered surface
34*r* rear tapered surface
34*s* left and right tapered surfaces
50, 50B, 50C receptacle
51 housing
53 terminal attachment portion
60 pin terminal
60*a* first type pin terminal
60*b* second type pin terminal
61 first contact portion
62 second contact portion
63 coupling portion
70 insertion portion
71 first opening portion
72 second opening portion
73 internal space
74 tapered surface
75 recessed portion
80 female terminal
81 base portion
82 engagement piece
83 arm portion
83*a* first arm portion
83*b* second arm portion
83*c* third arm portion
83*d* fourth arm portion
84 arm portion pair
84*a* first arm portion pair
84*b* second arm portion pair
85 first inclined portion
86 second inclined portion
D1 first insertion and removal direction
D2 second insertion and removal direction
H1 height
H2 height
H3 height
H4 height
W3 left-right width
W4 left-right direction width
W6 left-right direction distance

The invention claimed is:

1. A plug to be inserted into and removed from a receptacle in a predetermined insertion and removal direction, the plug comprising:
- a terminal portion to be inserted into and removed from an insertion portion of the receptacle,
- wherein the terminal portion includes
  - a contact, and
  - a holder portion that holds the contact,
- wherein the holder portion includes a flange portion on at least one side with the contact being interposed, the flange portion having a distal end portion protruding toward an insertion direction from a distal end of the contact in the insertion direction and protruding in a predetermined orthogonal direction orthogonal to the insertion and removal direction,
- wherein the holder portion includes a main portion adjacent to the flange portion,
- wherein the distal end portion of the flange portion includes a chamfered portion,
- wherein the chamfered portion is configured to position the distal end portion with respect to an opening portion of the insertion portion,
- wherein the flange portion is configured to position the terminal portion inserted into the insertion portion in the orthogonal direction, and
- wherein the contact is a planar conductor having a bent shape along a surface of the main portion.

2. The plug according to claim 1, wherein the distal end portion of the holder portion has a tapered surface.

3. The plug according to claim 1,
- wherein the flange portion is configured to position the terminal portion inserted into the insertion portion in a direction parallel to a plane orthogonal to the insertion and removal direction.

4. The plug according to claim 1, wherein two terminal portions are provided at positions separated from each other in the orthogonal direction.

5. The plug according to claim 4, wherein a plurality of contact pins are provided between the two terminal portions.

6. A connector, comprising:
- the plug according to claim 1; and
- the receptacle into and from which the plug is to be inserted and removed in the insertion and removal direction.

7. A receptacle to be electrically connected with the plug according to claim 1 by inserting and removing the terminal portion of the plug.

* * * * *